United States Patent [19]

Masuda et al.

[11] 4,366,478

[45] Dec. 28, 1982

[54] SIGNAL TRANSMITTING AND RECEIVING APPARATUS

[75] Inventors: Ikuro Masuda, Hitachi; Hisayoshi Shiraishi, Katsuta; Seiichiro Ogawa, Ichikawa; Shigeo Shiono, Hitachi; Jinichi Sakurai, Mito; Takeo Yuminaka, Katsuta, all of Japan

[73] Assignee: Hitachi, Ltd., Tokyo, Japan

[21] Appl. No.: 222,708

[22] Filed: Jan. 5, 1981

[30] Foreign Application Priority Data

Jan. 7, 1980 [JP] Japan ..................... 55-126

[51] Int. Cl.³ .................. G08C 25/00; H04L 7/00; H04O 9/00
[52] U.S. Cl. .................... 340/825; 370/82; 371/70; 375/117; 340/825.03; 340/825.21
[58] Field of Search .............. 340/147 R, 825, 825.21, 340/825.03; 375/117; 178/3; 370/85, 112, 61, 82; 371/49, 70, 47

[56] References Cited
U.S. PATENT DOCUMENTS

| | | | |
|---|---|---|---|
| 3,660,606 | 5/1972 | De Witt | 370/112 |
| 3,700,820 | 10/1972 | Blasbalg et al. | 370/82 |
| 3,855,422 | 12/1974 | Cadiou et al. | 370/82 |
| 3,975,712 | 8/1976 | Hepworth et al. | 371/49 |
| 4,017,683 | 4/1977 | Pederson et al. | 375/117 |
| 4,070,648 | 1/1978 | Mergenthaler et al. | 371/70 |
| 4,166,272 | 8/1979 | Deck | 371/70 |
| 4,263,673 | 4/1981 | Bingham et al. | 375/117 |

*Primary Examiner*—Donald J. Yusko
*Attorney, Agent, or Firm*—Antonelli, Terry & Wands

[57] ABSTRACT

Disclosed is a signal transmitting and receiving apparatus for transmitting and receiving parallel-by-word data signals, converting the parallel-by-word data signal to serial-by-word data signal, and transmitting the serial-by-word data signal to control units connected in a multi-drop connection configuration or receiving the signals transmitted from the control units.

An external control mode and an internal control mode in receiving the parallel-by-word data signal, a simulation mode, and the prevention of competing status between a write timing of the parallel-by-word data to a buffer memory and a read timing of the data for converting it to serial-by-word data are described.

8 Claims, 25 Drawing Figures

FIG. IA
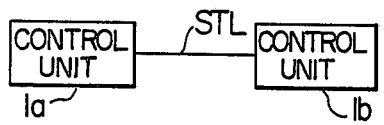
FIG. IB
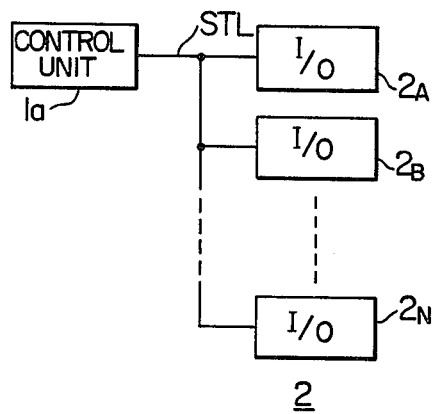
FIG. 2
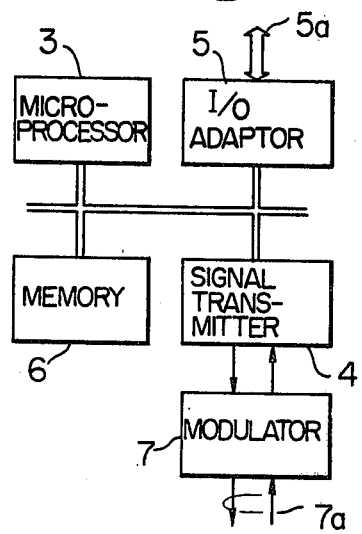
FIG. 3
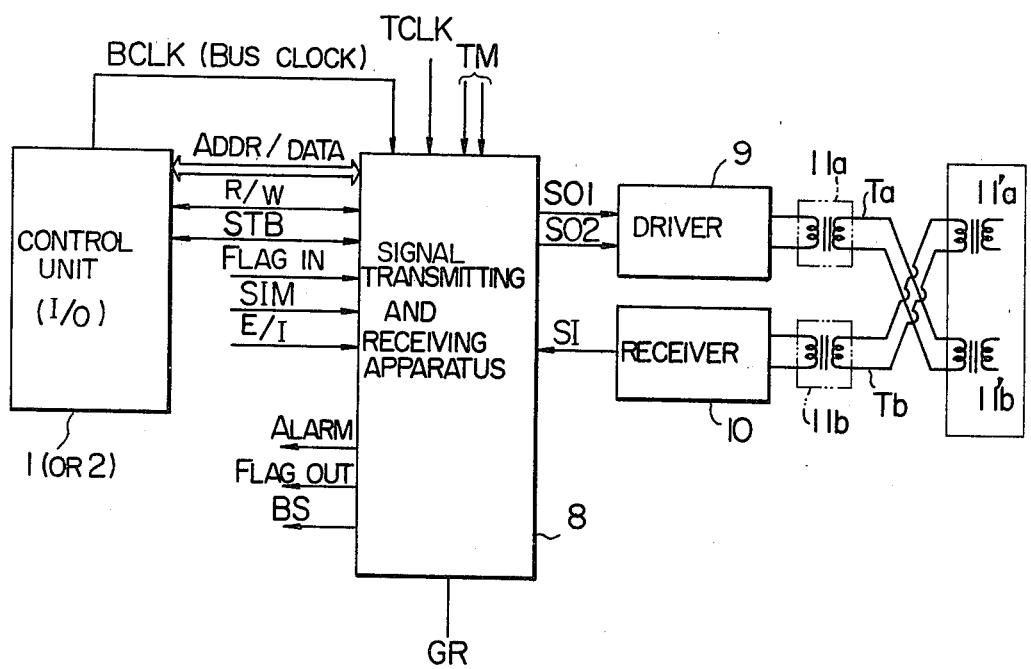

FIG. 10

| TERMINAL NUMBER | 1-BIT MODE | 8-BIT MODE | 16-BIT MODE |
|---|---|---|---|
| 0 | DATA 0 | DATA 0 | DATA 0 |
| 1 | | DATA 1 | DATA 1 |
| 2 | | DATA 2 | DATA 2 |
| 3 | | DATA 3 | DATA 3 |
| 4 | | DATA 4 | DATA 4 |
| 5 | | DATA 5 | DATA 5 |
| 6 | | DATA 6 | DATA 6 |
| 7 | | DATA 7 | DATA 7 |
| 8 | | | DATA 8 |
| 9 | | | DATA 9 |
| 10 | | | DATA 10 |
| 11 | | | DATA 11 |
| 12 | ADR 0 | | DATA 12 |
| 13 | ADR 1 | | DATA 13 |
| 14 | ADR 2 | | DATA 14 |
| 15 | ADR 3 | ADR 3 | DATA 15 |
| 16 | ADR 4 | ADR 4 | ADR 4 |
| 17 | ADR 5 | ADR 5 | ADR 5 |
| 18 | ADR 6 | ADR 6 | ADR 6 |
| 19 | ADR 7 | ADR 7 | ADR 7 |
| 23 | | | |

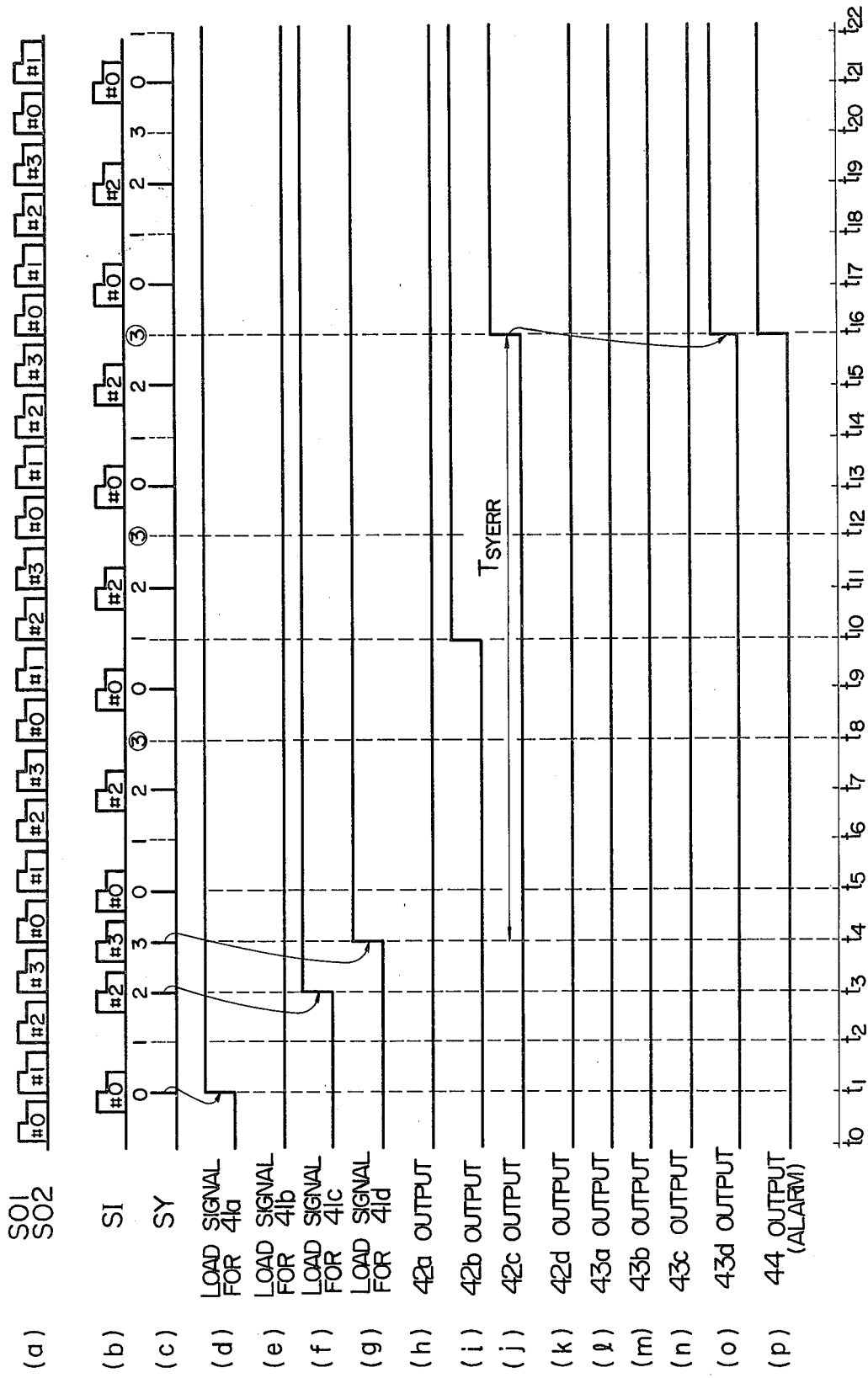

SIGNAL TRANSMITTING AND RECEIVING APPARATUS

BACKGROUND OF THE INVENTION

Field of the Invention

The present invention relates to a signal transmitting and receiving apparatus, and more particularly to a signal transmitting and receiving apparatus suitable for transmission and reception of signals between control units or between a control unit and an I/O device of a computer.

In many process controls including conveyer control, machine tool control, waterworks/drainage system control and chemical plant control, the controls are becoming more and more complex so that reliability in a high speed process has been required and a digital computer control has been widely used.

Frequently, a control unit is coupled to a mini-computer through a bilateral bus line to control the process by the mini-computer and signals are exchanged between the control unit and the mini-computer. In such a case, parallel-by-word data received from the bilateral data bus is converted to serial-by-word data to transmit it to a peripheral device, and serial-by-word data from the peripheral device is converted to parallel-by-word data to transmit it to the mini-computer. The transmission of serial data to the peripheral device is more effective than the transmission of parallel data in reducing the number of transmission lines included.

The present invention relates to a signal transmitting and receiving apparatus suitable for such signal transmission.

2. Description of the Prior Art

Heretofore, such a signal transmitting and receiving apparatus is formed by wired logics of integrated circuits. In such a case, even an average scale circuit needs fifty to sixty integrated circuits. This has been a problem in reducing an overall size. In addition, an essential problem has existed in that a configuration of the signal transmitting and receiving circuit must be altered depending on a particular type of device to be coupled and the wired logic system cannot cover a wide range of alternation.

In a known technology to solve these problems, there has been proposed a combination of a micro-computer and a peripheral large scale integrated circuit (LSI), which is disclosed in U.S. Pat. No. 3,975,712 entitled "Asynchronous Communication Interface Adaptor" (ACIA), issued Aug. 17, 1976. The ACIA is connected to a micro-computer through a bus line. In the above-mentioned U.S. Patent, it is connected to a modem through a line 109 as shown in FIG. 2 thereof. The ACIA includes means for converting parallel data to serial data and transmitting it, means for receiving serial data and converting it to parallel data and interface buffer means for controlling the transmission and reception. However, a signal bit format is an 8-bit fixed format and there is no teaching about a control unit to be connected to the ACIA. In actual control, the bit configuration is not fixed to the 8-bit format and the control unit may be connected in various ways. However, the ACIA is not adaptable to those modifications and hence it is not universal. In addition, one of the biggest limitations is that the ACIA can be used only when it is coupled to an MPU (microprocessing unit) through a bus line. In many actual applications, however, the system does not necessarily include the microprocessor and the signals are exchanged within the system. In this respect, the use of the ACIA is limited to a case where it is coupled to a CPU.

SUMMARY OF THE INVENTION

It is an object of the present invention to provide a general purpose signal transmitting and receiving apparatus for transmitting and receiving signals between a bilateral bus line and a serial-by-word data transmission line.

It is another object of the present invention to provide a signal transmitting and receiving apparatus which can transmit and receive parallel-by-word or serial-by-word data independent from the fact as to whether the signal transmitting and receiving apparatus is connected to a CPU or not.

It is a further object of the present invention to provide a signal transmitting and receiving apparatus which can transmit and receive signals without being restricted by the number of connections in a multi-drop connection system of a control unit to be connected to a serial-by-word data transmission line.

In order to attain the above objects, the present invention is characterized by the provision of a first buffer memory for storing parallel-by-word data, means for converting the parallel-by-word data read out of the first buffer memory to serial-by-word data and for transmitting it to a serial-by-word signal transmission line, a second buffer memory for converting the received serial-by-word data to parallel-by-word data and for storing it, and means for transmitting through a bilateral bus line the signal read out of the second buffer memory.

In order to attain the above objects, the present invention is further characterized by means for specifying a word length to effectively utilize the first buffer memory when data of different word lengths are to be stored in the first buffer memory, whereby the data is stored in the first buffer memory in accordance with the specified word lengths.

In order to attain the above objects, the present invention is further characterized by means for specifying whether the number of the control units connected to the serial-by-word data transmission line is one or N ($N \geq 2$, a natural numeral) for each of the signal transmitting and receiving apparatus, whereby the signals are transmitted and received in accordance with the specification.

In order to attain the above objects, the present invention is further characterized by selection means for specifying the signal transmission and reception condition as to whether the signal is transmitted and received under the condition that the CPU is coupled through the bilateral bus line or under the condition that a passive device having no CPU is coupled, whereby the signals are transmitted and received in accordance with the selection.

The present invention is further characterized by means for monitoring competition between a write timing of data to the first buffer memory and a read timing of data from the first buffer memory so that the data is read and written with a non-competing timing scheme.

BRIEF DESCRIPTION OF THE DRAWINGS

FIG. 1 shows a block diagram for illustrating a scheme of signal transmission, in which FIG. 1A shows a case where one control unit corresponds to one and FIG. 1B shows a case where one control unit corresponds to N control units.

FIG. 2 shows a scheme of coupling to peripheral devices of a microcomputer.

FIG. 3 shows a scheme of coupling of a signal transmitting and receiving apparatus of the present invention to other devices.

FIG. 5 shows connections for serial-by-word data transmission, in which

FIG. 10 illustrates address terminals and data terminals, partly in common.

FIGS. 17(a)–(p) show time charts for detecting loss of signal for a case of one-to-four connection.

DESCRIPTION OF THE PREFERRED EMBODIMENTS

Figure 4:
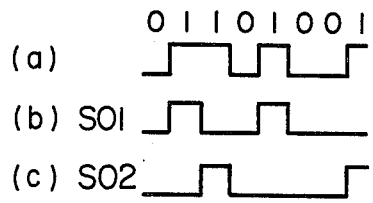
FIG. 4 shows an example of the serial-by-word data format.

First, a scheme of a signal transmitting and receiving apparatus which is a subject of the present invention is explained.

FIG. 1A shows a block diagram for the signal transmission and reception between control units 1a and 1b. The control units 1a and 1b are linked by a signal transmission line STL so that signals are transmitted between the respective control units. FIG. 1B shows a block diagram for the signal transmission and reception between a control unit 1a and a plurality of control units 2 (or I/O devices; $2_A$–$2_N$). The signal transmission and reception are carried out not only in a one-to-one connection of the control units but also it is frequently carried out in a one-to-N connection or so-called multi-drop connection, as shown in FIG. 1B. The signals processed may range from on-off one-bit signals such as those from limit switches to 8-bit signals or 16-bit signals. The present invention is intended to provide the signal transmitting and receiving apparatus which can be adaptable to any of those cases.

FIG. 2 shows a circuit configuration when a microcomputer is used, in which numeral 3 denotes a microprocessor, 4 denotes a signal transmitting LSI, 5 denotes an I/O adaptor, 6 denotes a memory, 7 denotes a modulator and 7a denotes a transmission line. The ACIA mentioned above has a similar circuit configuration (see FIG. 2 of U.S. Pat. No. 3,975,712). This arrangement cannot be used except when it is coupled to a CPU.

The present invention is characterized by the consolidation of a part of the function of the microprocessor 3 shown in FIG. 2 and a part of the function of the memory 6 into a signal transmitting LSI to attain high performance and universality. FIG. 3 shows a block diagram for illustrating a signal transmitting and receiving apparatus 8 of the present invention and peripheral circuits thereof. Legends used are explained by Table 1.

TABLE 1

| Symbol | Description of Legends Function |
|---|---|
| ADR | Address |
| DATA | Data (1-bit, 8-bit, 16-bit data, etc.) |
| R/W | Read/Write |
| STB | Strobe signal |
| E/I | External/internal selection signal |
| WL | Word length specifying signal |
| TM | Transmitting mode specifying signal |
| SO1 SO2 | Serial output signal (Bipolar modulation) |
| SI | Serial input signal |
| TCLK | Data transmitting clock signal |
| BCLK | Clock signal for controlling internal circuits of LSI |
| SIM | Simulation mode signal |
| FLAG IN | Transmission-in signal for emergent signal |
| FLAG OUT | Transmission-out signal for emergent signal |
| ALARM | Alarm signal |
| GR | General reset signal |

One part of the signal transmitting and receiving apparatus 8 is connected to the control unit 1 or the I/O device 2 to allow the write-in of data to be transmitted or the readout of data transmitted. The connection comprises an address signal ADR line, a data DATA line, a read/write selection signal R/W line and a strobe signal STB line for timing the write operation. The signal transmission scheme differs depending on whether the unit to be connected is an active circuit or a passive circuit. In the case of the active circuit, the signals are transmitted from or received by the signal transmitting and receiving apparatus 8 in an external control mode, and in the case of the passive circuit, on the other hand, in an internal control mode. This is specified by an E/I signal, which selects either the external control or the internal control. A word length signal WL indicates the number of bits of the data. It specifies the number of bits depending on a particular type of the control unit 1 or the I/O device 2.

Figure 5B:
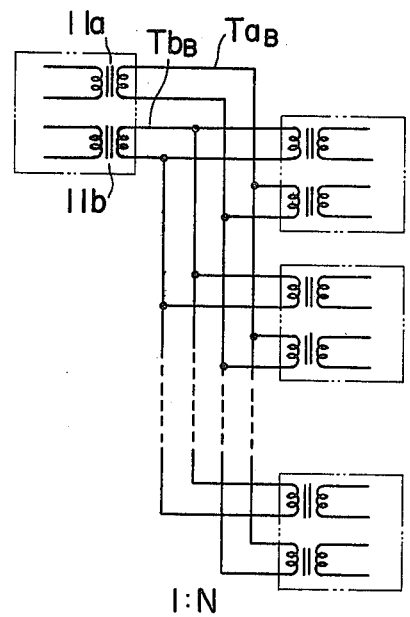
FIG. 5A shows a case for one-to-one connection and FIG. 5B shows a case for one-to-N connection.
Figure 5A:
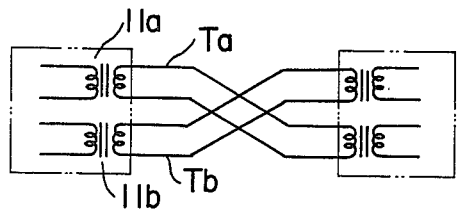

Connected to the other part of the signal transmitting and receiving apparatus 8 is a serial data processing circuit in which serial output SO1 and SO2 are applied to a driver 9 in a bipolar modulated form and coupled to a transmission line $T_a$ through an isolation transformer 11a. Inputs from another transmission line $t_b$ are coupled to a serial input SI line through another isolation transformer 11b and a receiver 10. The serial outputs are bipolar modulated in a manner shown in FIG. 4 so that SO1 (FIG. 4(b)) and SO2 (FIG. 4(c)) are alternately produced every time a non-modulated serial output (FIG. 4(a)) assumes "1". The outputs are coupled to the transmission line $T_a$ through the driver 9 and the isolation transformer 11a. Numerals 11'a and 11'b denote isolation transformers in a receiving station. Alternate positive and negative pulse signals are presented to the transmission line each time the non-modulated serial signal assumes "1". Accordingly, by full-wave rectifying the output from the isolation transformer 11b and amplifying it in the receiving station, a non-modulated serial output is produced. This is represented by the receiver 10. A transmission mode signal TM is used to specify the connection of the transmission line. A detail thereof is shown in FIG. 5. In a one-to-one connection shown in FIG. 5A, input and output lines are merely crossed, but in a one-to-N connection shown in FIG. 5B, buses $T_{aB}$ and $T_{bB}$ are used.

Figure 6:
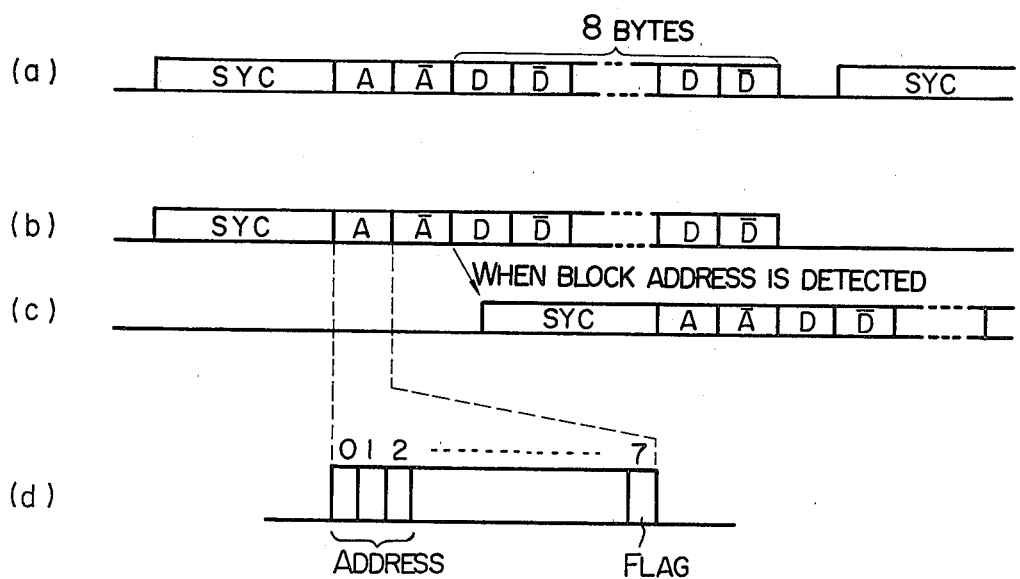
FIGS. 6(a), (b) and (c) show examples of transmission data formats for one-to-one connection and one-to-N connection shown in FIG. 5.
FIG. 6(d) illustrates a flag transmission mode.

FIG. 6 shows data formats in the transmission line. FIG. 6(a) shows the format for the one-to-one connection. In the one-to-one connection, the serial data transmitted comprises a synchronizing signal SYC, followed by block addresses A and $\overline{A}$, followed by four-byte data D and $\overline{D}$, which are transmitted in a complementary repeat mode. Since the data capacity is assumed to be 256 bits, eight such blocks form a data frame. The data is cyclically and serially transmitted, and the input and output operate asynchronously and independently from each other. The block address actually needs only three bits but an 8-bit space is allocated for the simplification of the circuit. Symbol $\overline{A}$ represents a complement of A, and symbol $\overline{D}$ represents a complement of D. The symbol D represents an 8-bit data byte and a symbol SYC represents a synchronizing signal of 24 bits (0, 1, 1, ... 1, 1, 0).

FIG. 6(b) illustrates an example of the signal transmission from a master station to slave stations in the one-to-N connection, and FIG. 6(c) illustrates an example of the signal transmission from the slave station to the master station, and FIG. 6(d) illustrates the transmission of a flag signal.

In the one-to-N connection, the format of the serial data is identical to that of the one-to-one connection except for the synchronization between the input and the output. The master station transmits the data continuously but each of the slave stations receives the data only when the block address coincides with its own address, and transmits the data to the master station. Again, in this case, the data from the master station is transmitted cyclically as is the case of the one-to-one connection so that the slave stations each respond once in each frame.

Figure 7:
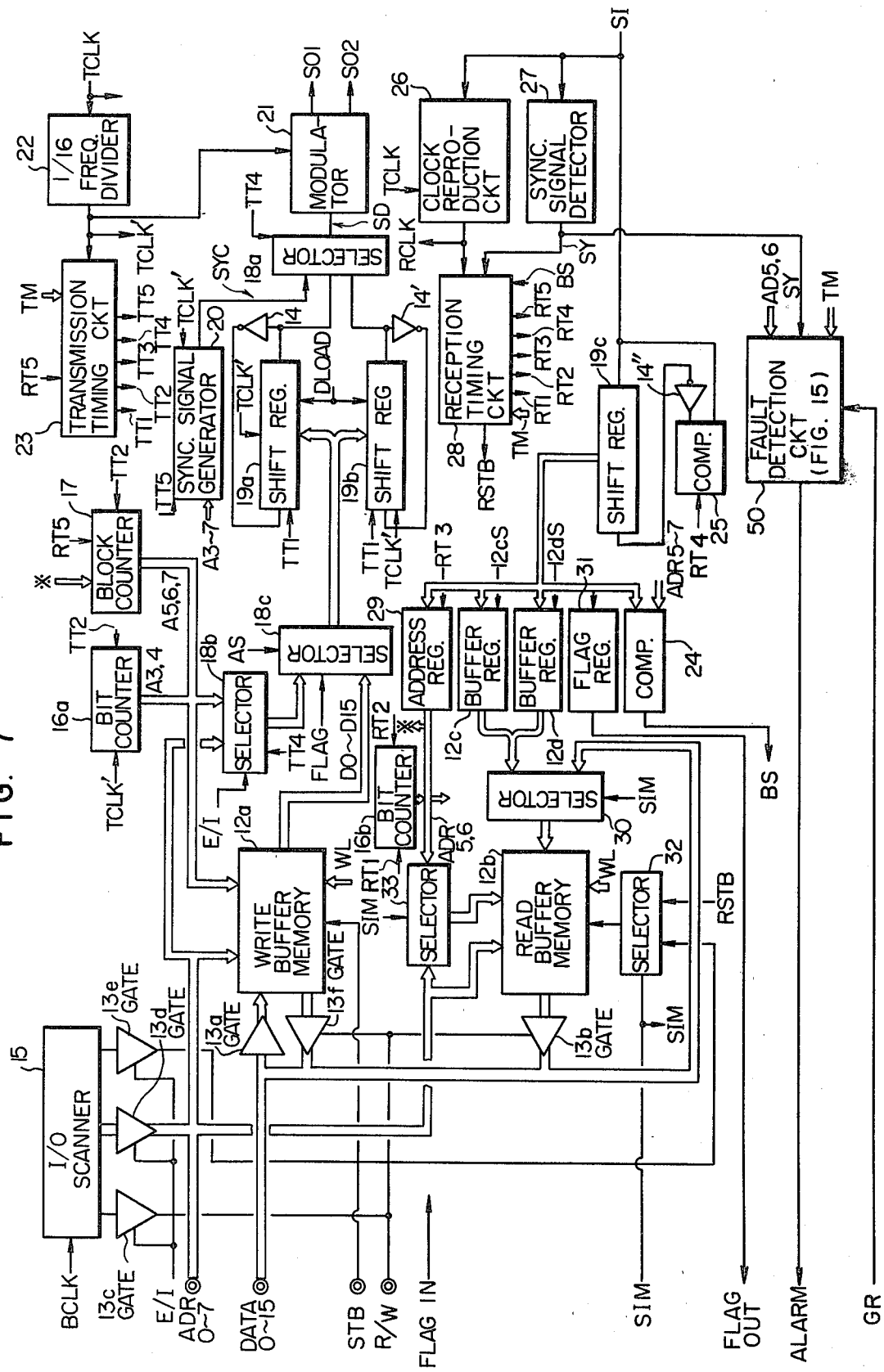
FIG. 7 shows a block diagram of a configuration of the signal transmitting and receiving apparatus shown in FIG. 3.

FIG. 7 shows an internal circuit of an LSI implementation of the signal transmitting and receiving apparatus 8 which implements the above operations. A general outline of the circuit is first explained. Referring to FIG. 7, external address information ADR 0-7 are applied as addresses for two write and read buffer memories 12a and 12b. Data DATA 0-15 is applied to the buffer memory 12a through a gate circuit 13a. The gate circuits 13a and 13b are polarized oppositely depending on whether a write operation or a read operation is being performed. The signal R/W is applied as one of the gate signals while the R/W signal is applied through an inverter circuit as the other gate signal so that only one gate circuit opens at a time to control the direction of data flow. The signal STB is applied to the write buffer memory 12a to provide a write timing. Of those four signal lines, the signal lines ADR, R/W and STB receive an output of an I/O scanner 15 through gate circuits 13c, 13d and 13e, respectively. The I/O scanner automatically and sequentially accesses the inputs and the outputs. When the gate circuits 13c, 13d or 13e opens, the corresponding one of the three signals is sent to the external. This is to be determined by an E/I signal depending on whether the external control or the internal control is carried out. The signal E/I controls the gates of the gate circuits 13c, 13d and 13e. On the other hand, the buffer memory 12a selects one of internal decoders in response to a signal WL to change the word length to be accessed. The buffer memory 12a has independent I/O address and data so that it can be accessed from the opposite side.

The change of the word length by WL is disclosed in detail in a copending U.S. application Ser. No. 194,226 entitled "Input/Output control device for memory device storing variable-length data and method of controlling thereof", filed by Hideo Maejima et al. Oct. 6, 1980, and assigned to the same assignee as the present application. Accordingly, the explanation therefor is omitted here.

Added to one address of the write buffer memory 12a are two high order bits (A3, A4) of a bit counter 16a and the three bits (A5, A6, A7) outputted from a block counter 17 to form a 5-bit address.

The bits A5–A7 are also applied to a selector 18b which receives input ADR 5–7. These inputs A5–A7 and ADR 5–7 are selected in response to the signal E/I. An output from the selector 18b is applied to another selector 18c which also receives output D0–D7 from the buffer memory 12a. These inputs are selected by the selector 18c. An output from the selector 18c is applied in parallel to shift registers 19a and 19b. Serial outputs from the shift registers 19a and 19b are applied to a selector 18a and also applied to inverters 14 and 14' to provide serial inputs. Another input to the selector 18a is an output from a synchronizing signal generation circuit 20, and an output SD from the selector 18a is applied to a modulation circuit 21 which produces bipolar modulated outputs SO1 and SO2. On the other hand, an externally applied reference clock signal TCLK is frequency-divided in a scale-of-16 frequency divider 22 to present a transmission clock signal TCLK' which is used to clock the shift registers 19a and 19b, the bit counter 16a, the synchronizing signal generation circuit 20 and the modulation circuit 21. The signal TCLK' is also applied to a transmission timing circuit 23 which responds to a transmission mode TM signal to produce a series of timing signals necessary for the transmission. The timing signals supplied are a load signal TT1 for the shift registers 19a and 19b, a count signal TT2 for the block counter 17, a selection signal TT4 for the pair of selectors 18a and 18b and a reset signal TT5 for the synchronizing signal generation circuit 20. The transmission timing circuit 23 for generating those timing signals may be readily constructed by a counter and a decoder.

The serial input SI is applied to a shift register 19c and a parallel output therefrom is applied to an address register 29, a comparator 24 and the buffer registers 12c and 12d of the read buffer memory 12b. On the other hand, the serial output is applied to an inverter circuit 14", thence to a comparison circuit 25 where it is compared with the input SI. An output of the address register 29 is applied to the block counter 17 of the transmission station and also is used as an address for the buffer memory 12b, together with the output of the bit counter 16b. The output of the shift register 19c is compared with ADR 5-7 by the comparator 24 which produces a block address equality signal BS when they are equal. The serial input SI is also applied to a clock reproduction circuit 26 which produces a receiving clock signal RCLK. The input SI is also applied to a synchronizing signal detection circuit 27 which produces a synchronizing signal detection signal SY. The receiving clock signal RCLK is used as clock signals for the shift register 19c and the synchronizing signal detection circuit 27 and it is also applied to a reception timing circuit 28 which produces timing signals necessary for the reception in response to the synchronizing signal detection signal SY, the address equality signal BS and the transmission mode signal TM. The timing signals include six signals, namely a write strobe signal RSTB for the read buffer memory 12b, a clock signal RT1 for the bit counter 16b, a reset signal RT2, a set signal RT3 for the address register 29, a timing signal RT4 for the comparison circuit 25 and a start request signal RT5 for the transmission timing circuit 23. The reception timing circuit 28 may also be constructed by a counter and a decoder.

The operation of the circuit shown in FIG. 7 is now explained. First, let us assume that data to be transmitted through the signal transmitting and receiving apparatus 8 is to be written into the buffer memory 12a. Depending on the specification by the signal E/I, one of two operation modes is selected. In the external control mode (E), the data is written into the buffer memory 12a in response to the external signal. This mode corresponds to a case where a microprocessor is connected. The internal control mode (I) corresponds to a case where the external data is written into the buffer memory 12a by the signal transmitting and receiving apparatus when an active circuit such as a microprocessor is not included.

Figure 8:
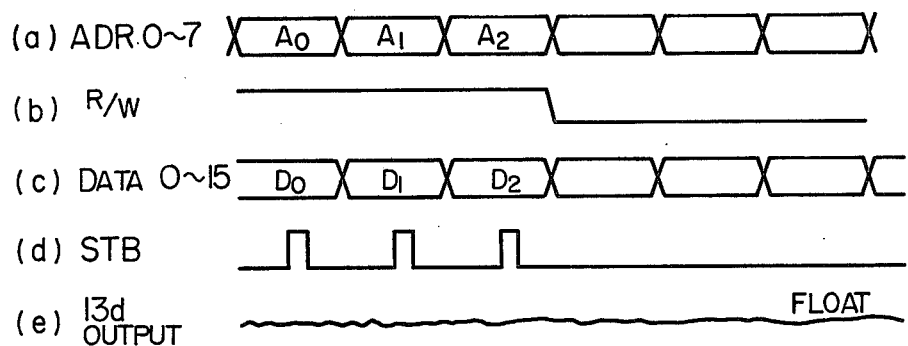
FIGS. 8(a)–(e) show timing charts for an external control mode.

FIG. 8 shows time charts for the external control mode. The signals R/W and ADR 0-7 (FIGS. 8(a) and (b)) are externally applied and the write data corresponding to ADR 0-7 is applied to DATA 0-15 (FIG. 8(c)). At this time, the output signals of the I/O scanner 15 are not gated by the functions of the gates 13c, 13d and 13e which are selectively opened and closed by the signal E/I so that the output signals are not mixed with the externally applied signal. When the strobe signal STB (FIG. 8(d)) is applied under this condition, the data is written into the buffer register 12a. The output signal of the gate 13d is floating.

Figure 9:
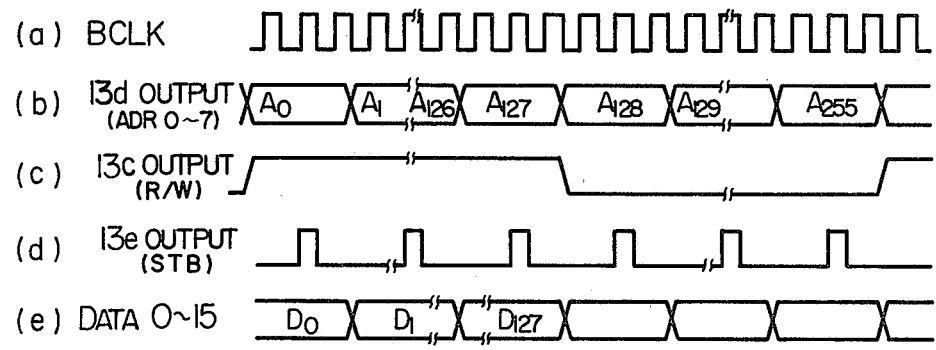
FIGS. 9(a)–(e) show timing charts for an internal control mode.

FIG. 9 shows time charts for the internal control mode (I). The I/O scanner 15 produces the signal 13c (FIG. 9(c)), the signal 13d (FIG. 9(b)) and the signal 13e (FIG. 9(d)) in response to the reference clock signal BCLK (FIG. 9(a)). Those signals are applied to the buffer register 12a as the signals ADR 0-7, R/W and STB, respectively, and also supplied to the external of the LSI signal transmitting and receiving apparatus 8 of the present invention through bilateral terminals (shown by double circles in FIG. 7).

The DATA 0-15 externally refer the signals ADR 0-7 and R/W externally of the present apparatus to apply the corresponding signals to the buffer memory 12a. As a result, the data D0-D127 (FIG. 9(e)) corresponding to the addresses A0-A127 generated by the I/O scanner 15 is written into the buffer memory 12a. FIG. 9(a) shows the reference clock signal BCLK.

The word length selection is now explained. The word length is selected by two signals WL (WL0, WL1) for the three cases, that is, one-bit access (bit mode), 8-bit access (byte mode) and 16-bit access (word mode). One example is shown in Table 2 which is a duplication from the above-mentioned U.S. Copending application Ser. No. 194,226.

TABLE 2

| Selection of Word Length | | |
|---|---|---|
| WL0 | WL1 | Word Length |
| 0 | 0 | 16 bits |
| 0 | 1 | 8 bits |
| 1 | 0 | 1 bit |
| 1 | 1 | — |

In connection with the selection of word length, the sharing of the data I/O terminals and the address I/O terminals is explained.

FIG. 10 illustrates the sharing of the terminals. A memory capacity is assumed to be 256 bits. In the 1-bit mode, an 8-bit address ($1 \times 2^7 = 256$) is necessary, in the 8-bit mode, a 5-bit address ($8 \times 2^4 = 256$) is necessary, and in the 16-bit mode, a 4-bit address ($16 \times 2^3 = 256$) is necessary. In FIG. 10, ADR 0-3 (terminal numbers 12-15) for the 1-bit mode and ADR 3 for the 8-bit mode, which are shown in a thick line block, are shared by the data terminals and the address terminals. Since they are not simultaneously used, such sharing is allowed. If they are not shared, four more terminals (20-23 shown in dotted block in FIG. 10) are necessary to attain the 1-bit mode. Thus, the sharing offers a significant advantage in saving the terminals, reducing the size of the LSI chip and miniturizing the LSI package.

Figure 11:
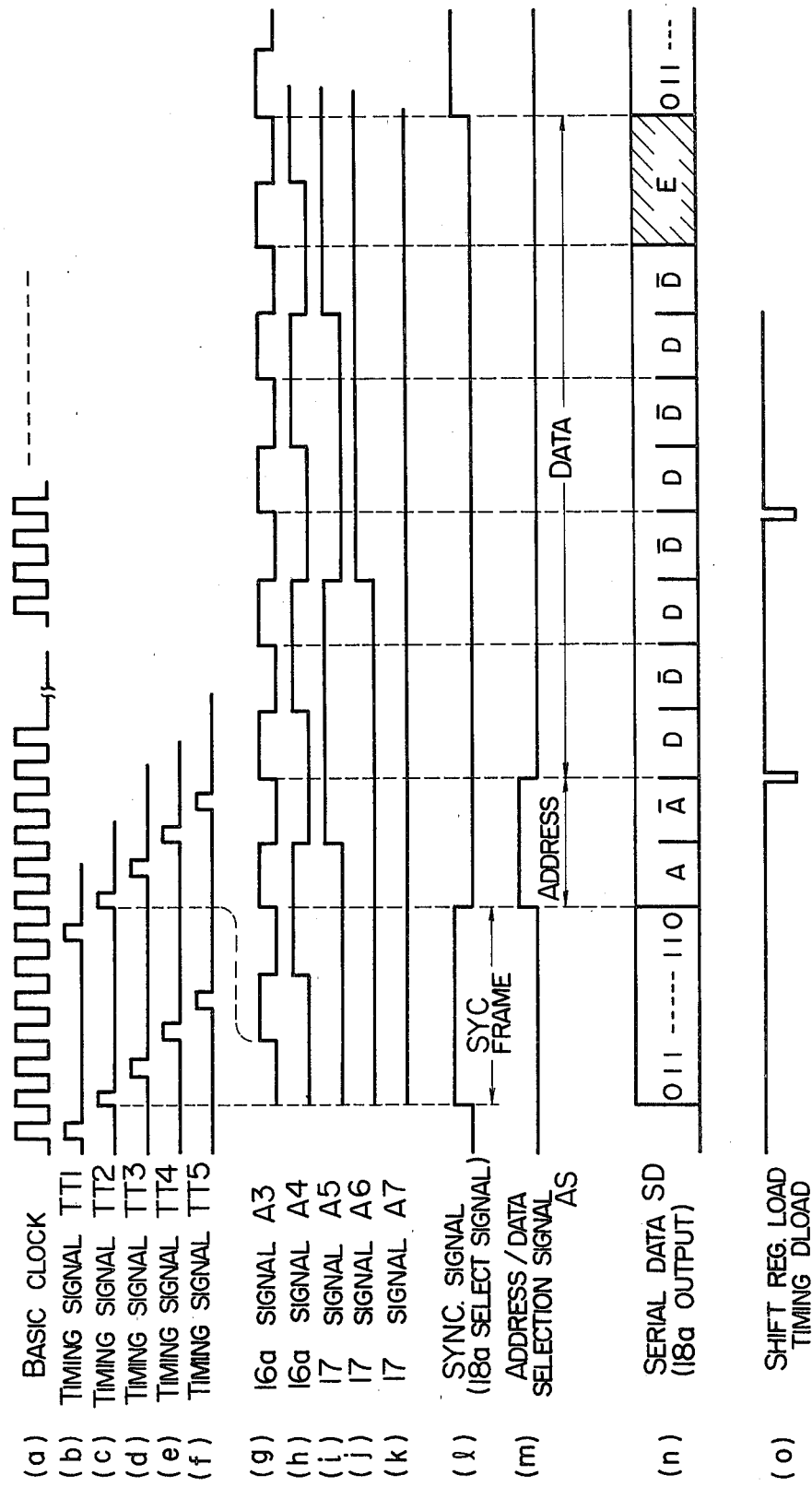
FIGS. 11(a)–(e) show transmission timing of the serial-by-word signals from the signal transmitting and receiving apparatus.

The content of the buffer memory 12a can be read out by specifying a read address. The read address is specified by the bit counter 16a and the block counter 17. In this manner, the data is transmitted while it is read. The transmitting signal has the signal format shown in FIG. 6. FIG. 11 shows transmission time charts. The reference clock signal TCLK is frequency divided by the scale-of-16 frequency divider 22 which produces the signal TCLK'. The signal TCLK' is applied to the transmission timing circuit 23 which produces the timing signals TT1-TT5. (FIGS. 11(b)-(f)). The bit counter 16a and the block counter 17 count the timing signals TT2 to produce signals A3-A7 (FIGS. 11(g)-(k)). The synchronizing signal generation circuit 20 refers the signals A3-A7 to generate a synchronizing pattern signal SYC (FIG. 11(l)) of three-byte length and controls the selector 18a to apply the synchronizing signal SYC to the modulation circuit 21.

Figure 12:
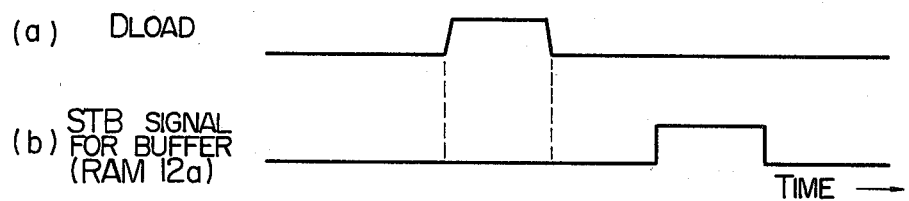
FIGS. 12(a) and (b) and FIGS. 13(a) and (b) show write timing to the first buffer memory and read timing from the first buffer memory.
Figure 13:
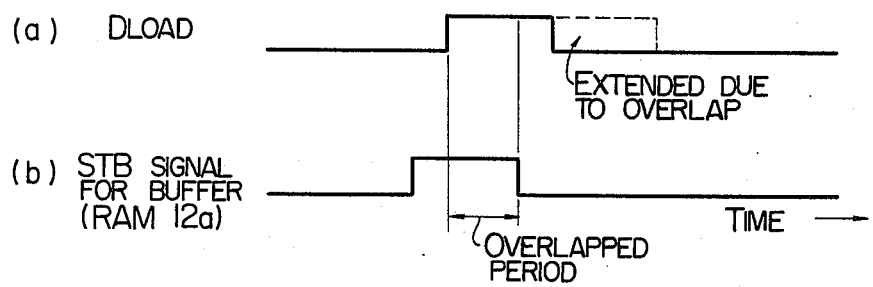
Figure 19:
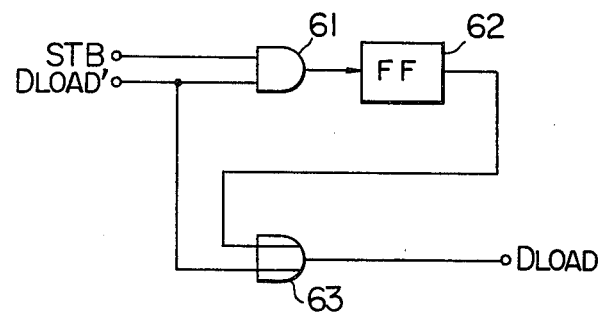
FIG. 19 shows an embodiment of a circuit for obtaining the overlaped portion of the waveform shown in FIG. 13(a).

The selector 18c refers the signals A3-A7 to load the output from the selector 18b to the shift registers 19a and 19b only during the address data out period. The address data thus loaded is converted to serial data by the shift registers 19a and 19b. Following the address data, data D0-D15 is selected by the selector 18c and loaded into the shift registers 19a and 19b. The timing of loading the data D0-D15 is as follows. A shift register load timing signal DLOAD (FIG. 11(o)) generated by the output signals A3, A4 of the bit counter 16a, the output signals A5-A7 of the block counter 17 and the timing signal functions to load the output signal from the buffer memory (RAM) 12a into the shift registers 19a and 19b and watches the presence or absence of competition with the write strobe signal STB for the buffer memory 12a. A time chart where the load timing signal DLOAD and the strobe signal for the buffer memory 12a do not compete with each other is shown in FIG. 12, and a time chart where they do compete is shown in FIG. 13. The load timing signal DLOAD and the strobe signal STB are shown in FIGS. 12(a) and 13(a) and FIGS. 12(b) and 13(b), respectively. In FIG. 12, there is no competition, that is, there is no overlap between those signals, and the data loaded in the shift registers is sent out in the same procedures as those for the address data. On the other hand, in FIG. 13, there is a competition or overlap between the signals DLOAD and STB. In this case, the signal DLOAD is extended as shown by a broken line in FIG. 13(a) so that the data is loaded with non-overlapped timing. After the data has been loaded, it is sent out in accordance with the same procedures as those for the address data. FIG. 19 shows a circuit which is for producing the signal portion shown by broken line in FIG. 13(a) but which is omitted in FIG. 7. The circuit shown in FIG. 19 comprises a logic circuit 61 for providing a logical AND function of the timing signal DLOAD' and the strobe signal STB from the timing generation circuit, a single-shot flip-flop 62 and a logical OR circuit 63.

When the signal STB competes with the signal DLOAD', the single-shot flip-flop 62 is activated to expand the signal DLOAD for a predetermined time period as shown by the dotted line.

The address is a block address. The address for the master station for the one-to-one connection or the one-to-N connection is specified by the block counter 17, and for the slave station for the one-to-N connection, the inputs ADR 5-7 are used to specify the blocks, which are selectively sent out. When the data has been loaded into the shift registers 19a and 19b, they output serial data and invert it to provide serial data for the first time, and output the complementary data for the second time. In this manner, the complementary repeat is enabled. Following the synchronizing signal and the address signal described above, the data selected and the 4-byte data sent out in the complementary repeat mode, like the address transfer. After the 4-byte data has been sent out, a time period corresponding to two bytes, that is, a time period E shown in the time chart of FIG. 11(n) is spent, whereupon one cycle is completed. The bit counter 16a and the block counter 17 are again initialized to start the transmission starting from the synchronizing signal SYC. The transmission continues cyclically so long as the basic clock signal is applied.

Figure 14:
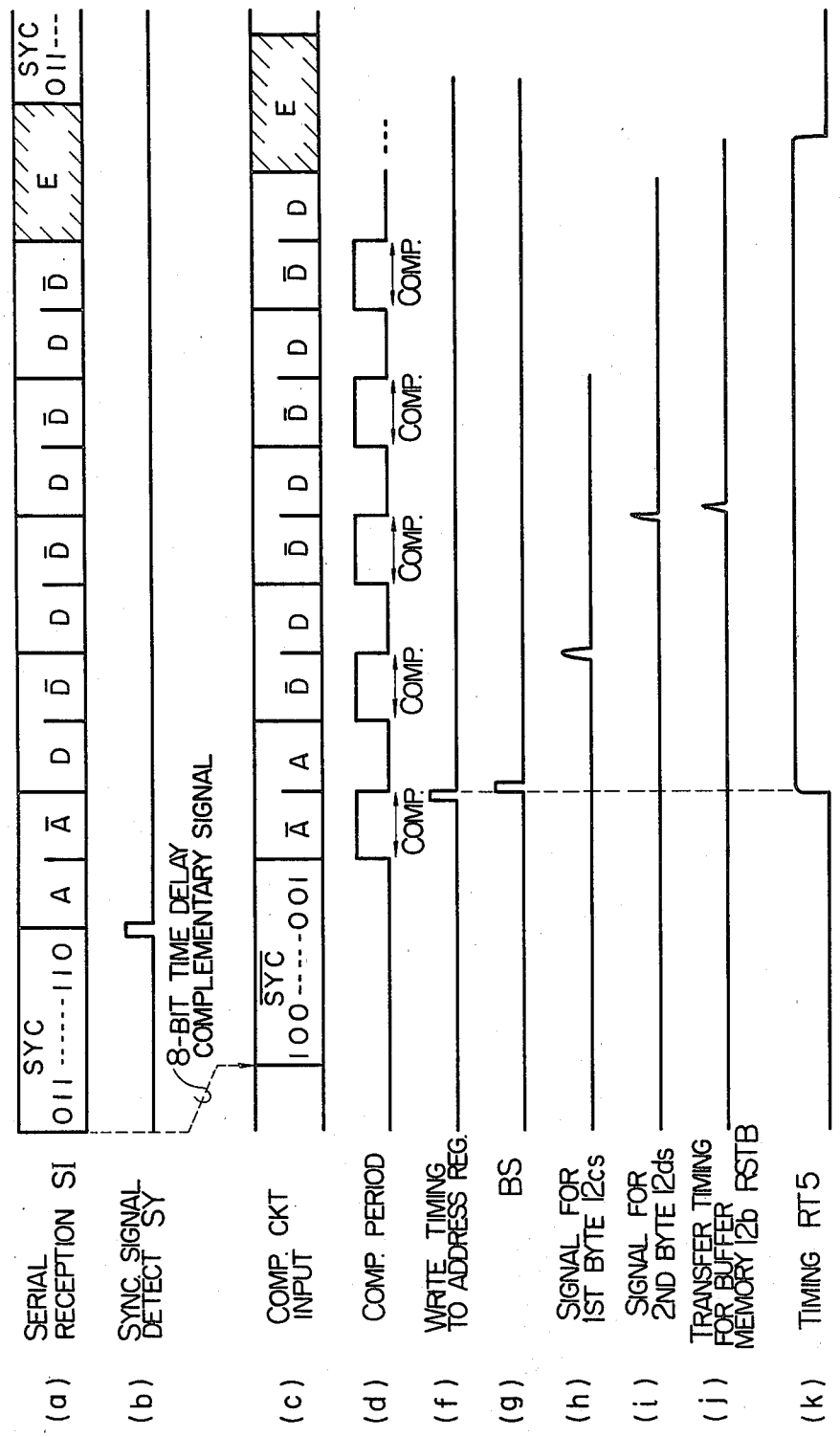
FIGS. 14(a)–(k) illustrate reception timing of the serial-by-word signals.

On the other hand, the received data is applied to the clock reproduction circuit 26 which produces clocks in phase with the transmission clocks of the station from which the data is transmitted, and the synchronizing signal detection circuit 27 detects the synchronizing signals in the data train. The receiver starts to operate upon the detection of the synchronizing signal, the serial data is loaded to the shift register, and the parallel output is used as the address or the data. Prior to this operation, the complement of the serial output is compared with the serial input by the comparison circuit 25 to detect any error. The serial data of 16-bit or 2-byte length is a significant data. Since the complementary repeat check is effected for every byte, the parallel output data becomes effective only after two successive bytes have been received. The reception buffer registers 12c and 12d are 8-bit shift registers, respectively, and they temporarily store the result of the complementary repeat check which is carried out over two bytes until it is transferred 16 bits (two bytes) at a time to the buffer memory 12b at a timing RSTB. The reception time chart therefor is shown in FIG. 14.

The first occurring signal of the parallel signals is the address signal, which is loaded to the address register 29, and in the case of the slave station for the one-to-N connection, it is compared with ADR 5-7 by the comparator 24 to determine if one of its own stations is selected. If there is no error and if the station is selected as the slave station in the one-to-N connection, or if the station is the master station in the one-to-one connection or in the one-to-N connection, the output data from the shift register 19c is subsequently written into the buffer memory 12b. The address therefor is provided by the address register 29 and the bit counter 16b. The readout of the content of the buffer memory 12b thus loaded is now explained. In the external control (E) mode, as shown in the read cycle of the time chart of FIG. 8, the ADR 0-7 and R/W are externally specified so that the data at those addresses is read out to DATA 0-15.

In the internal control mode, the output signals from the gate circuits 13c, 13d and 13e generated from the reference clock signal like in the case of the write operation are applied as the signals R/W, ADR 0-7 and STB to provide the data at the addresses ADR 0-7 to DATA 0-15. At the same time, the signals ADR 0-7, R/W and STB are also sent out of the present apparatus. Numeral 13f denotes a gate circuit.

The selection of the transmission mode is now explained. The selection of the transmission mode is controlled by the transmission timing circuit 23 and the reception timing circuit 28. In the one-to-one connection and for the master station of the one-to-N connection, the data is repeatedly sent out in the format shown in FIG. 6. In the one-to-one connection, both stations send out the data independently, and in the one-to-N connection the master station has the leadership. For the slave stations of the one-to-N connection, only the station that has the same block address as that specified by the master station sends out the data. When produced by the comparator 24, the block address equality signal BS is applied to the reception timing circuit 28 which generates the signal RT5 if TM specifies the slave station in the one-to-N connection. The signal RT5 is applied to the block counter 17 to load the address stored in the address register 29. The signal RT5 is also applied to the transmission timing circuit 23 so that the transmission operation is initiated to send out the data in the format shown in FIG. 6. In the slave station in the one-to-N connection, the transmission operation starts when the received address coincides with the block address and it stops when one block of data has been sent. In this manner, the competition of the outputs of the slave stations in the one-to-N connection is prevented.

A simulation mode is now explained. In the external control mode (wherein E is selected by E/I), the data is written into the buffer memory 12a and the data is read out of the buffer memory 12b as explained above. Let us assume that the data is written into the buffer memory 12b by the signals ADR 0-7, DATA 0-15 and STB in the same manner as is done for the buffer memory 12a. That is, simulation data is written into the buffer memory 12b independently of the received serial signal. The buffer memory to be accessed and one of the read and write operations are specified by the signals ADR and R/W. The signal S/M is applied to a selector 30 to select the write mode to the buffer memory 12b. The address line of the buffer memory 12b and the write strobe signal line are also selected by selectors 33 and 32. Because of those selections, the data is written into the buffer memory 12b independently of the serial data even if it is being received. The simulation data is written into the memories 12a and 12b. The readout operation is the same as the readout operation already described above.

A flag operation is now explained. The flag bit is transmitted using a vacant bit position in the address transmission byte. Referring to FIG. 7, when a signal FLAG IN is applied, the flag bit in the transmission format shown in FIG. 6(d) is set to "1" so that the serial transmission is carried out. The receiver circuit which has received the serial data having "1" at the flag bit position loads "1" to a flag register 31, which outputs it as FLAG OUT. In this manner, when the signal FLAG is applied in the transmitting station, the receiving station receives and identifies it and outputs it externally. Since the flag mode can transmit the signal without routing it to the buffer memories 12a and 12b, it is frequently used in the emergent data transmission.

Figure 15:
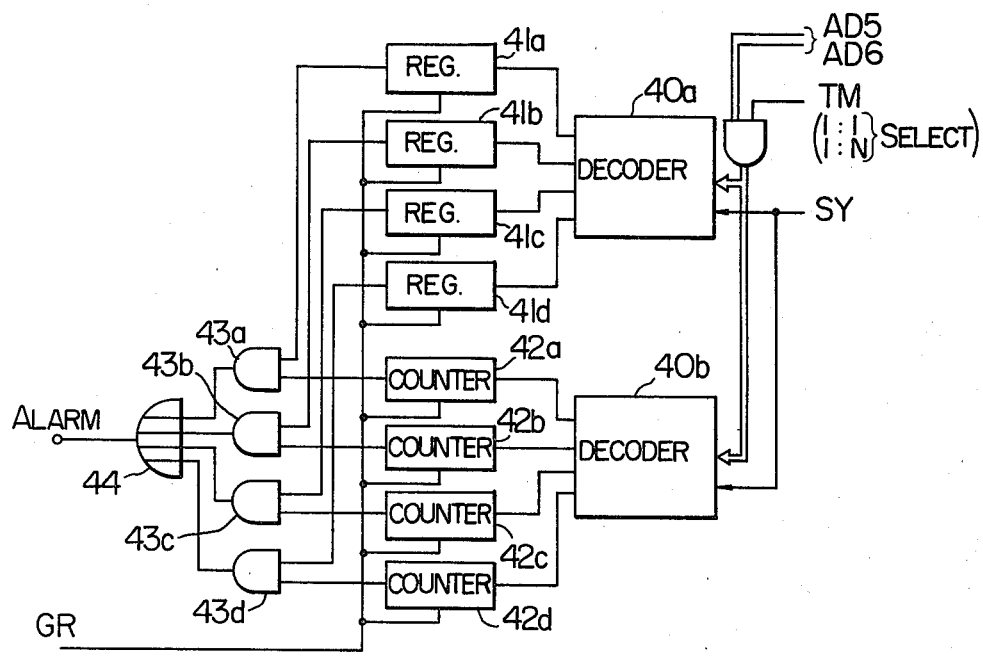
FIG. 15 shows a fault detection circuit for a synchronizing signal.

A function for detecting a loss of signal is now explained. When the signal is lost by the fault in the transmitter, an open circuit in the transmission line or other reasons, it must be detected. In the present signal transmitting and receiving apparatus, it is detected if the synchronizing signal is periodically received. Since all of the maximum number N of stations may not be connected in the one-to-N connection, the loss of synchronizing signal is detected for the slave stations which have received the synchronizing signal at least once. FIG. 15 shows an embodiment thereof.

Figure 16:
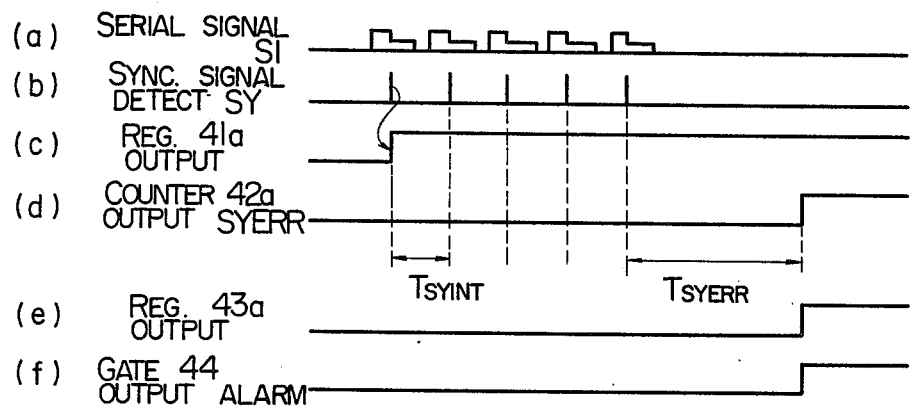
FIGS. 16(a)–(f) show time charts for the circuit shown in FIG. 15.

The case of the one-to-one connection is discussed first. When the synchronizing signal is detected by the synchronizing signal detection circuit 27, the circuit 27 produces the signal SY which is applied to a decoder 40a. In the one-to-one connection, the decode value of the decoder 40a is predetermined by the mode selection signal TM such that the signal SY is applied only to the register 41a. The register 41a is set by the signal SY and kept set unless a signal GR (general reset) is subsequently externally applied. In this manner, the register 41a stores the fact that the synchronizing signal was detected once. The signal SY is also applied to a decoder 40b, which, in the one-to-one connection, provides the output signal only to a counter 42a. The counter 42a produces an output signal SYERR when the signal SY is not detected throughout a time interval $T_{SYERR}$. In the example shown in FIG. 16, $T_{SYERR}$ is set to three times as long as a period $T_{SYINT}$ of the signal SY (that is, $3T_{SYINT} \approx T_{SYERR}$), the loss of signal is detected only when three or more successive synchronizing signals are not detected.

The case of one-to-N connection (N=4 in the illustrated embodiment) is now discussed. The serial signals are cyclically transmitted from the master station to the slave stations in the sequence of addresses (FIG. 17(a)). The signals #0–#3 are repetitively transmitted. The four stations which have the address #0–#3 transmit back the serial data (SI) (FIG. 17(b)). It is now assumed that the slave station #1 is not connected. The synchronizing signal detection signal SY is derived by detecting the synchronizing signal in the signal transmitted back from the slave station. The signal SY is applied to the decoder 40a and thence distributed to the registers 41a, 41b, 41c and 41d in accordance with the addresses AD5, 6 of the decoder.

The detection signal derived by detecting the synchronizing signal from the reply signal from the slave station #0, that is, the signal SY in FIG. 17(c) (the signal at time $t_1$) is loaded to the register 41a to set the register 41a. Like in the case of the one-to-one connection, the register 41a is not reset unless the signal GR is externally applied. At time $t_2$, the signal SY is not generated because the slave station #1 is not connected. Therefore, the register 41b is not set. At times $t_3$ and $t_4$, the registers 41c and 41d are set by the signals SY resulting from the slave stations #2 and #3, respectively. In this manner, the registers 41a, 41c and 41d corresponding to the slave stations #0, #2 and #3, respectively, from which the synchronizing signals have been detected at least once are set.

On the other hand, the signal SY is distributed by the decoder 40b in accordance with the addresses #0–#3, to the counters 42a, 42b, 42c and 42d. The counters each produce an output if it detects that the signal SY has not been received during the time interval $T_{SYERR}$. In the example shown in FIG. 17, the signal SY for the slave station #3 has not been received during the time interval from $t_4$ to $t_{16}$ and hence the counter 42c produces the output signal at time $t_{16}$. For the slave station #1 which is not connected, the counter 42b produces the output signal at time $t_{10}$.

As a result, AND gates 43a–43d produce an output signal for the slave station #3 from which the synchronizing signal has been detected once but three successive synchronizing signals have not been detected. That is, the AND gate 43d produces the output signal which causes an OR gate 44 to produce an output signal ALARM. This signal indicates the loss of signal from the slave stations other than the non-connected slave station. In this manner, the fault in the signal after the synchronizing signal has been detected can be detected.

FIG. 18 shows examples of system configuration which applies the signal-transmitting semiconductor IC or LSI, according to the present invention.

Figure 18A:
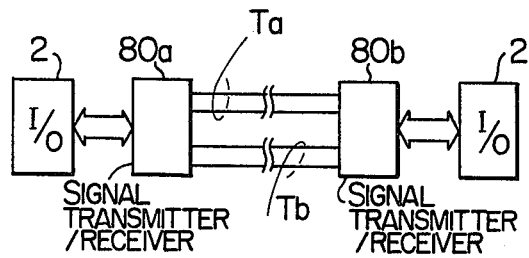
FIGS. 18A–18E show connection examples of the signal transmitting and receiving apparatus.

FIG. 18A shows a configuration in which input status in one station is transferred to an output of the other station. Operation mode is one-to-one connection, and the signal transmitting units or LSI's 80a and 80b both operate in the internal control mode.

Figure 18B:
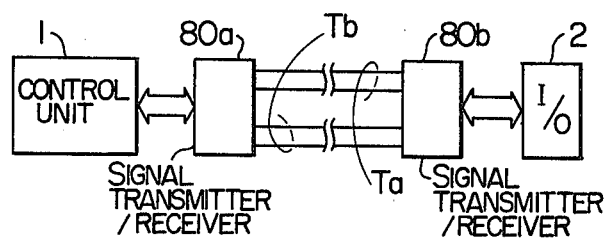
Figure 18C:
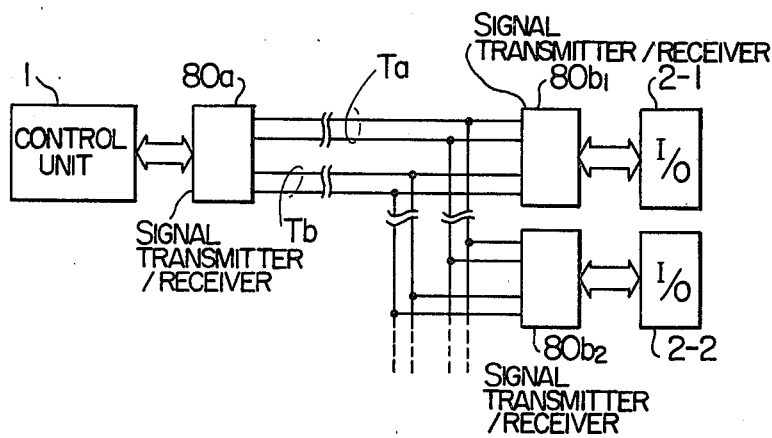
Figure 18D:
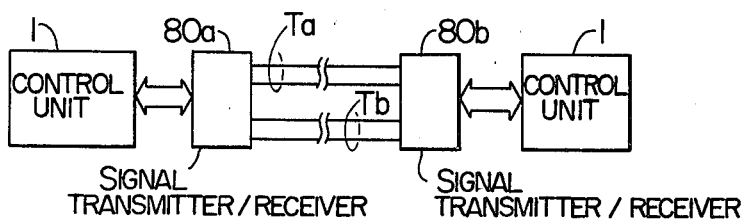
Figure 18E:
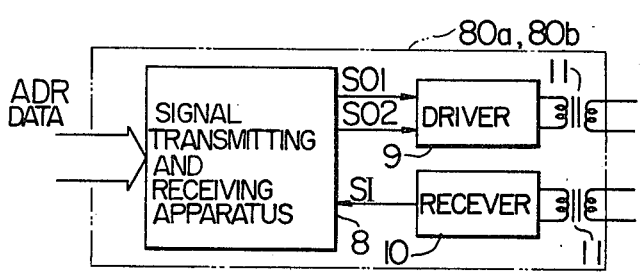

FIG. 18B shows a configuration in which input and output status of the control unit is remotely utilized. It is called a remote I/O device configuration. The unit 80a on the control unit side operates in one-to-one connection, external control mode and the unit 80b on the I/O device side operates in one-to-one connection, internal control mode. FIG. 18C shows a configuration in which a plurality of I/O devices 2-1, 2-2, . . . similar to the I/O device 2 of FIG. 18B are distributed. It is called a distributed I/O device configuration. The unit 80a on the control unit side is a master station of the one-to-N connection and operates in the external control mode, and the units 80b on the I/O device side are slave stations for the one-to-N connection and operate in the internal control mode. FIG. 18D shows the signal transmission between the control units. The units 80a and 80b both operate in one-to-one connection, external control mode. In the systems described above, the word length may be varied depending on the types of the control units or the I/O devices. FIG. 18E shows a basic construction of the unit 80a or 80b.

While the complementary repeat is used for the signal transfer format of the embodiment discussed above, it is not essential. The BCH (Bose Chaubhuri Hocquemghem) code which enables the error detection by byte or by word may be used.

As described hereinabove, the signal transmitting and receiving apparatus of the present invention consolidates the functions in transmitting and receiving the signals. By installing one of the present apparatus to each of various control units, the signal transmission and reception between the stations are facilitated. Thus, the control unit can be simplified and the size thereof can be reduced.

We claim:

1. A signal transmitting and receiving apparatus for effecting signal transmission between control units or between a control unit and one or more I/O devices, comprising means for receiving parallel-by-word data and for converting said parallel-by-word data to serial-by-word data, means for transmitting said serial-by-word data, means for receiving transmitted serial-by-word data and for converting said serial-by-word data to parallel-by-word data, and means for transmitting the converted parallel-by-word data, wherein said signal transmitting and receiving apparatus further comprises:
first buffer memory means for storing an incoming parallel-by-word data signal;
first signal transmitting means for reading out the parallel-by-word data signal stored in said first buffer memory means, and for converting said parallel-by-word data signal to a serial-by-word data signal, and for transmitting said converted signal-by-word data signal cyclically;
second buffer memory means for converting an incoming serial-by-word data signal to a parallel-by-word data signal, and for storing said converted parallel-by-word data signal;
second signal transmitting means for reading out the parallel-by-word data signal stored in said second buffer memory means, and for transmitting said read-out parallel-by-word data signal; and
access word length setting means for setting the access word length for the writing/reading operations of said first and second buffer memory means independent of the word length for the data transmission, including at least a bit counter for counting the number of bits which are determined by the access word length and a block counter indicating a block in each of said first and second buffer memory means.

2. A signal transmitting and receiving apparatus according to claim 1, further comprising signal setting means for setting a signal other than said data; a selector for setting a signal (FLAG IN) from said signal setting means into a vacant bit or bits of the address bits as one of the input signals thereof; a flag register for identifying the signal set in said vacant bit or bits of the address bits of the received serial-by-word data signal and for producing the identified signal as an output signal (FLAG OUT); and means for processing the set signal other than said data.

3. A signal transmitting and receiving apparatus according to claim 1, comprising a register for storing a signal (SY) indicating detection of a synchronizing signal in the first-received serial-by-word signal upon the initiation of signal transmission by said apparatus to produce an output indicating the contents thereof, a counter for producing an output signal when no synchronizing signal is detected in a period of each of the serial-by-word data signals received subsequently to the detection of said synchronizing signal in the first-received serial-by-word data signal, and an AND circuit for producing an output signal in response to a logical AND function of said register and the output signal of said counter, thereby to detect an abnormality in the subsequently received serial-by-word data signals.

4. A signal transmitting and receiving apparatus according to claim 3, wherein said counter produces an output signal when said detection signal (SY) for the synchronizing signal is not detected a plural number of times.

5. A signal transmitting and receiving apparatus for effecting signal transmission between control units or between a control unit and an I/O device, comprising means for receiving parallel-by-word data and for converting said parallel-by-word data to serial-by-word data, means for transmitting said serial-by-word data, means for receiving the transmitted serial-by-word data and for converting said serial-by-word data to parallel-by-word data, and means for transmitting the converted parallel-by-word data, wherein said signal transmitting and receiving apparatus further comprises:
a first buffer memory for storing incoming parallel-by-word data signal;
signal transmitting means for reading out the parallel-by-word data signal stored in said first buffer memory, and for converting said parallel-by-word data signal to serial-by-word data signal, and for transmitting said converted serial-by-word data signal cyclically;
a second buffer memory for converting incoming serial-by-word data signal to parallel-by-word data signal, and for storing said converted parallel-by-word data signal;
transmitting means for reading out the parallel-by-word data signal stored in said second buffer memory, and for transmitting said read-out parallel-by-word data signal;
means for specifying the number of slave stations which transmit and receive the serial-by-word data signals to and from said signal transmitting and receiving apparatus which is regarded as a master station, a transmission timing circuit for generating transmission timing signals in response to a signal from said means for specifying the number of slave sations, and a reception timing circuit for generating reception timing signals in response to the signal from said means for specifying the number of slave stations, whereby signal transmission and reception is effected between said signal transmitting and receiving apparatus and the specified number of slave stations.

6. A signal transmitting and receiving apparatus for effecting signal transmission between control units or between a control unit and an I/O device, comprising means for receiving parallel-by-word data and for converting said parallel-by-word data to serial-by-word data, means for transmitting said serial-by-word data, means for receiving the transmitted serial-by-word data and for converting said serial-by-word data to parallel-by-word data, and means for transmitting the converted parallel-by-word data, wherein said signal transmitting and receiving apparatus further comprises:
a first buffer memory for storing incoming parallel-by-word data signal;
signal transmitting means for reading out the parallel-by-word data signal stored in said first buffer memory, and for converting said parallel-by-word data signal to serial-by-word data signal, and for transmitting said converted serial-by-word data signal cyclically;

a second buffer memory for converting incoming serial-by-word data signal to parallel-by-word data signal, and for storing said converted parallel-by-word data signal;

transmitting means for reading out the parallel-by-word data signal stored in said second buffer memory, and for transmitting said read-out parallel-by-word data signal;

a first selector for specifying an address for writing data into said second buffer memory through a bilateral address bus line connected to said second buffer memory, a second selector for selectively providing to said second buffer memory an external control mode strobe signal (STB) or write strobe signal (RSTB) for writing the data, and a third selector for selecting the signal from a bilateral data bus line or the parallel-by-word signal converted from the serial-by-word signal received by said signal transmitting and receiving apparatus, for writing the data into said second buffer memory, said first, second and third selectors selecting the signals under the control of an applied selection signal (SIM).

7. A signal transmitting and receiving apparatus for effecting signal transmission between control units or between a control unit and an I/O device, comprising means for receiving parallel-by-word data and for converting said parallel-by-word data to serial-by-word data, means for transmitting said serial-by-word data, means for receiving the transmitted serial-by-word data and for converting said serial-by-word data to parallel-to-word data, and means for transmitting the converted parallel-by-word data, wherein said signal transmitting and receiving apparatus further comprises:

a first buffer memory for storing incoming parallel-by-word data signal;

signal transmitting means for reading out the parallel-by-word data signal stored in said first buffer memory, and for converting said parallel-by-word data signal to serial-by-word data signal, and for transmitting said converted serial-by-word data signal cyclically;

a second buffer memory for converting incoming serial-by-word data signal to parallel-by-word data signal, and for storing said converted parallel-by-word data signal;

transmitting means for reading out the parallel-by-word data signal stored in said second buffer memory, and for transmitting said read-out parallel-by-word data signal;

an I/O scanner for controlling input and output of the parallel-by-word data signal in accordance with a basic clock signal, read/write control gate means controlled by a signal specifying an internal control mode or an external control mode of said signal transmitting and receiving apparatus in response to a read/write control signal derived from said I/O scanner, address control gate means controlled by said signal specifying the internal control mode or the external control mode of said signal transmitting and receiving apparatus in response to an address control signal derived from said I/O scanner, and strobe control gate means controlled by the signal specifying the internal control mode or the external control mode of said signal transmitting and receiving apparatus in response to a strobe control signal derived from said I/O scanner, whereby said signal transmitting and receiving apparatus is selectively used in the external control mode or the internal control mode.

8. A signal transmitting and receiving apparatus having circuit means mounted on a LSI chip, said circuit means comprising:

a first buffer memory for storing incoming parallel-by-word signal;

signal transmitting means for reading out the parallel-by-word signal stored in said first buffer memory, converting said parallel-by-word signal to serial-by-word signal and for transmitting said serial-by-word signal cyclically;

a second buffer memory for converting incoming serial-by-word signal to parallel-by-word signal and for storing the converted parallel-by-word signal;

transmitting means for reading out the parallel-by-word signal stored in said second buffer memory and for transmitting the read-out parallel-by-word signal;

means for specifying a word length for read and write operations of said first and second buffer memories;

means for specifying the number of slave stations which transmit and receive the serial-by-word signals to and from said signal transmitting and receiving apparatus regarded as a master station;

a transmission timing circuit for generating a transmission timing signal in response to a signal from said means for specifying the number of slave stations;

a reception timing circuit for generating a reception timing signal in response to the signal from said means for specifying the number of slave stations, an I/O scanner for controlling input and output of said parallel-by-word signal in accordance with a basic clock signal;

read/write control gate means controlled by a signal specifying an internal control mode or an external control mode of said signal transmitting and receiving apparatus in response to a read/write control signal derived from said I/O scanner;

address control gate means controlled by the signal specifying the internal control mode or the external control mode of said signal transmitting and receiving apparatus in response to an address control signal derived from said I/O scanner; and strobe control gate means controlled by the signal specifying the internal control mode or the external control mode of said signal transmitting and receiving apparatus in response to a strobe control signal derived from said I/O scanner.

* * * * *